No. 828,782. PATENTED AUG. 14, 1906.
J. SPODEN.
PLOW ATTACHMENT.
APPLICATION FILED MAY 2, 1906.
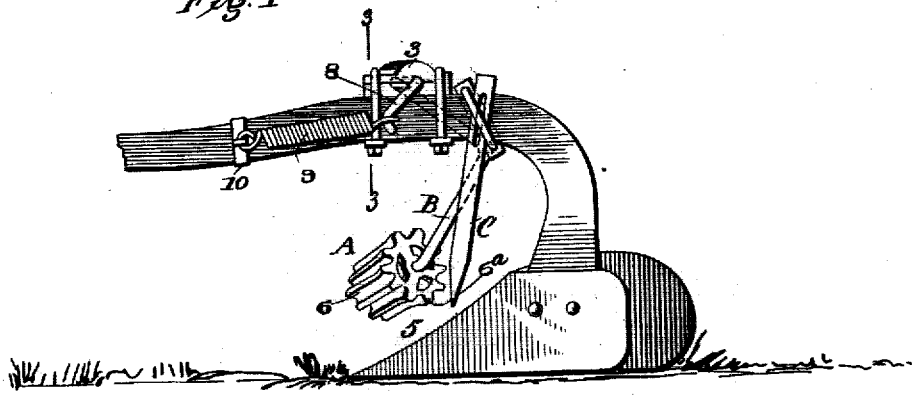
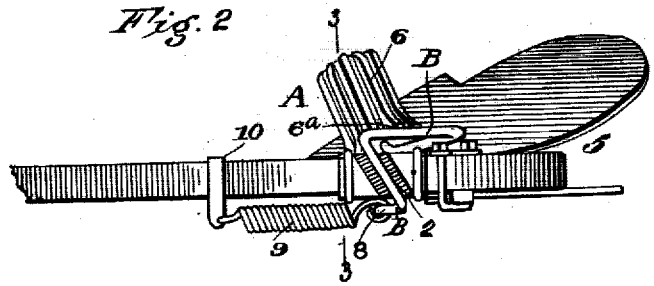
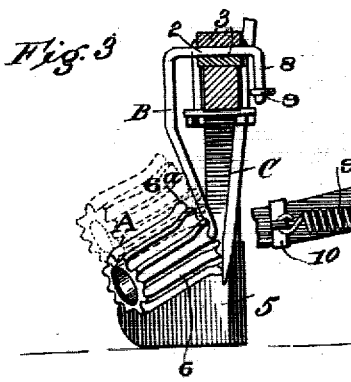
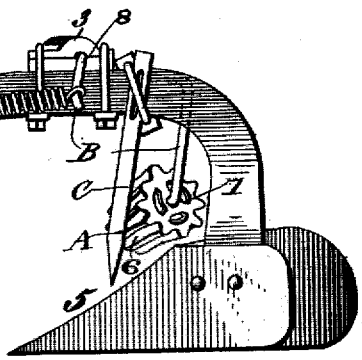
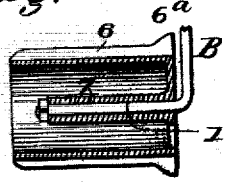
WITNESSES
INVENTOR
JOHN SPODEN
BY
ATTORNEYS

UNITED STATES PATENT OFFICE.

JOHN SPODEN, OF CLYDE, WASHINGTON.

PLOW ATTACHMENT.

No. 828,782.  Specification of Letters Patent.  Patented Aug. 14, 1906.

Application filed May 2, 1906. Serial No. 314,779.

*To all whom it may concern:*

Be it known that I, JOHN SPODEN, a citizen of the United States, and a resident of Clyde, in the county of Walla Walla and State of Washington, have invented an Improved Plow Attachment, of which the following is a specification.

In many agricultural localities wheat or other grain is headed in harvesting, thus leaving long straw or stubble which clogs the plow in subsequent fall and spring cultivation, so that the plowmen find it necessary to make frequent halts in order to remove the straw or stubble, so as to continue to do effective work.

I have devised an improved plow attachment for pressing down or flattening wheat-straw stubble or grass on the furrow-slice as turned by the plow. To this end I provide a ribbed roller which is held rotatably on a swinging arm journaled on the plow-beam, the roller being adapted to work at such angle and in such proximity to the moldboard of the plow that it acts on the furrow-slice at its turning-point, so as to break, press down, or flatten the straw, stubble, or grass in such manner that it is buried in the furrow beneath the slice.

The details of construction, arrangement, and operation of my improved attachment are as hereinafter described, and illustrated in the accompanying drawings, in which—

Figure 1 is a side view of a plow provided with my improved attachment. Fig. 2 is a plan view of the same. Fig. 3 is a vertical transverse section on the line 3 3 of Fig. 2. Fig. 4 is a central longitudinal section of the straw or stubble roller. Fig. 5 is a side view showing the roller in the position it occupies when at work.

A hollow iron or other metal roller A is mounted rotatably upon the journal 1, formed by the lower end of an angular arm B, whose upper horizontal portion 2 is journaled in a bearing 3, that rests upon and is clamped to the plow-beam 4 at a point almost directly over the share or point 5 of the plow. The said roller is ribbed longitudinally or, in other words, provided with a series of lengthwise ribs 6, which are thickened or extended radially at their inner ends 6ª for a purpose that will be presently explained. The roller is constructed hollow for sake of convenience and economy of manufacture. A suitable bearing 7 may be provided, as shown in Fig. 4, the bent portion or journal of arm B passing through the elongated bearing and having a nut applied to its inner end, whereby the roller is secured to the journal detachably. The roller-bearing may be constructed integrally or with spokes forming the outer end of the same. The arm B has four principal bends or angles at its upper end 8, (see Fig. 3,) being bent downward and curved at its extremity, as indicated in Fig. 1, thus forming a lever member to which a spiral spring 9 is attached, the opposite end of the spiral being secured to a collar 3. The roller-journal 1, and consequently the roller itself, is placed at an inclination of sixty degrees with the moldboard or inclined side of the plow proper, so that it may correspond to the inclination of a furrow-slice as it passes up over the share or moldboard and is turned thereby, so as to lie inverted in the furrow previously made. The pressure of the roller against the furrow-slice tends to force it backward, which movement is resisted by the spiral 9 to a degree corresponding to its strength or tension.

In Figs. 1, 2, and 3 the roller is shown in the forward position—that is to say, in the position it assumes when the spiral 9 is contracted—and Fig. 5 shows the position it assumes when forced rearward, the spiral being in such case expanded more or less. The ribs or teeth of the hollow roller A cause it to take a firm hold on the furrow-slice and also aid in breaking down the straw or stubble thereon. The radial projection 6ª of the ribs enables it to prevent lateral escape of the straw or stubble to a greater degree than is practicable with ribs of uniform thickness or height. In other words, such projection 6ª prevents the straw or stubble slipping out laterally from the roller at the end nearest the plow-beam.

From Fig. 2 it will be seen that the transverse horizontal portion 2 of the arm B, which constitutes the upper arm, is arranged at an inclination to the plow-beam or, in other words, crosses at a suitable angle—say thirty degrees. Such angular arrangement of the journal 2 and the inclination of the roller A enable the latter to swing upward away from the beam, so that it cannot come in contact with the latter when in operation.

The bar C (see Figs. 1, 3, and 5) is attached to the beam 4 just in rear of the journal-bearing 3 and projects downward and forward. It is adapted to serve as a guard for catching the straw or stubble or, in other words, assisting in turning the straw or stubble downward laterally, so that it will be caught by the roller A and more effectively broken down and flattened. The guard C may be secured by a clamp or slotted to receive a clamping-bolt. When the plow and its attachment are in use, the roller is pressed back behind the guard C, as shown in Fig. 5; but, as indicated in other figures, the roller is held normally in front of the guard when not in use. When traveling to or from the field, the spring is unhooked and the roller A turned up on top of the plow-beam.

It will be seen that by the construction and combination of parts hereinafter described I produce an attachment for rolling down and flattening straw and stubble in plowing which is adapted for application to plows in general; further, that the attachment may be easily applied and removed and is in itself simple and inexpensive and very effective in operation. When applied to gang-plows, it may be fastened to a cross-brace extending between and connecting the beams.

What I claim is—

1. The combination, with a plow of an attachment for rolling down straw and stubble, the same comprising a roller having longitudinal ribs, an angular arm journaled upon the plow-beam and pendent therefrom, the roller being arranged at an angle to a beam and share to adapt it to work on the outer side of the furrow-slice, and a retracting-spring attached to the plow-beam and connected with a lever member of said arm, whereby it tends to resist rearward movement of the roller when acting on the furrow-slice, substantially as described.

2. The combination, with a plow, of the attachment comprising a roller for acting on a furrow-slice, an angular arm on whose longer pendent member the said roller is mounted, the arm being journaled on the plow-beam and its shorter member being pendent on the side of the beam opposite the roller, and a spiral retracting-spring attached to such shorter member and to a forward portion of the plow-beam, as and for the purpose specified.

3. The combination, with a plow, a straw and stubble roller, a swinging arm upon which it is mounted rotatably and a contractible spring, of a guard consisting of a bar attached to the beam and projecting downward adjacent to the inner end of the roller, whereby it is adapted to aid in turning straw and stubble on the furrow-slice, substantially as described.

JOHN SPODEN.

Witnesses:
 CHARLES ACHERMANN,
 J. A. WISEMAN.